Jan. 2, 1940. H. RIDLEY 2,185,570
LINING OF PIPES WITH CEMENTITIOUS MATERIAL
Filed July 30, 1937
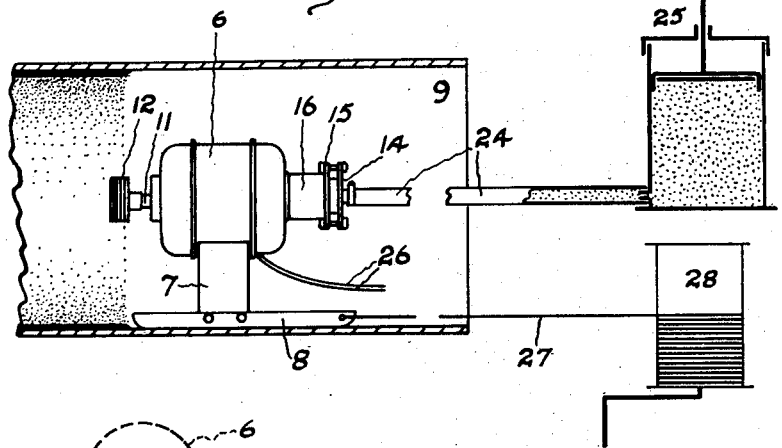
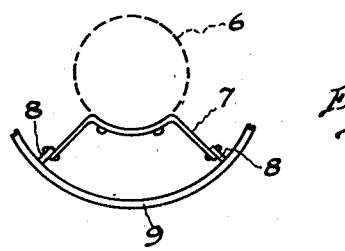
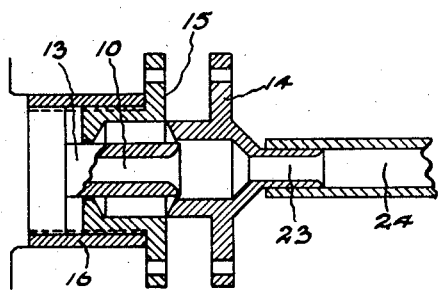
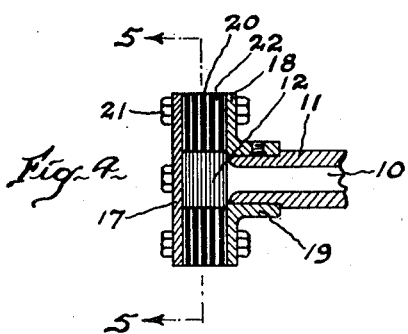
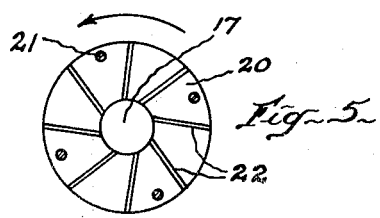
INVENTOR
HARRY RIDLEY
By Fred Walsh Patented Jan. 2, 1940

2,185,570

UNITED STATES PATENT OFFICE 2,185,570

LINING OF PIPES WITH CEMENTITIOUS MATERIAL

Harry Ridley, Bronte, near Sydney, New South Wales, Australia

Application July 30, 1937, Serial No. 156,601
In Australia July 30, 1936

3 Claims. (Cl. 91—44)

Heretofore in the lining of pipes with cementitious material conical spreaders or "projectiles" have been used, which are adapted to plaster a lining of cement mortar onto the pipe interior whilst being travelled therethrough. Owing to the pipe irregularities and to other causes it has not been possible (by the mentioned method) to deposit a lining of a lesser thickness than about three eighths of an inch; such thickness of lining is enormously greater than is necessary to effectively protect a pipe interior and such methods are consequently very wasteful of mortar and are expensive to practice due to the unnecessarily large quantities of mortar that have to be mixed and handled. Further such devices are not suitable for the efficient lining of pipes of large diameter say from 10" upwards.

In another form of lining apparatus a wheeled carriage is adapted to traverse a pipe and on this carriage is a motor and a rotatable mortar slinger which is fed with mortar by a helical conveyor below a hopper (also on the carriage), replenished from a wheeled truck which is filled at the open end of the pipe, proceeds along the pipe and has its contents tipped into the mentioned hopper, said truck then returning to the open pipe end for a further load.

This latter method gives quite good results but only in respect of pipes which are large enough to permit an operator to enter the pipe.

This invention has been devised to overcome the mentioned disabilities by providing pipe lining means for use in situ or otherwise whereby a lining of any desired thickness may be speedily and cheaply applied to pipes of any internal diameter excepting small pipes say below 2" diameter.

According to this invention the pipe lining means consist of a chassis having wheels, skids or other devices thereon to enable its haulage along and within the pipe to be lined. Upon this chassis is an electrical motor adapted to rotate a centrifugal mortar "slinger" consisting (in a present preferred construction) of a plurality of discs adjoined by vanes or pins, one of the discs has means associated therewith whereby mortar may be deposited within the said slinger. The mortar slinger discs are preferably maintained approximately co-axial with the pipe to be lined and the interior of the slinger has a feed pipe or hose extending therefrom to a mortar pump or other means for forcing mortar under pressure along the said feed pipe.

The motor has electrical leads or conductors to a source of E. M. F. and the chassis has a hauling cable thereon.

Referring to the accompanying drawing (which is partly schematic) wherein one form of the invention is illustrated:

Fig. 1 is a side elevation of pipe lining mechanism.

Fig. 2 is an end elevation of a motor support.

Fig. 3 is a section of a gland and stuffing box wherein the transfer of mortar from a nonrotatable hose to a rotatable conduit is effected.

Fig. 4 is a sectional elevation of a slinger and

Fig. 5 is a section on line 5—5 in Fig. 4.

A motor 6 is secured in cradle 7 having skids 8 which rest on the floor of a pipe to be lined 9, the cradle being suitably dimensioned to approximately render the axes of the pipe and motor coincident; the motor's shaft is axially bored as indicated at 10, one end 11 thereof opening into a centrifugal slinger 12 whilst the other end 13 opens into the gland 14 of stuffing box 15 secured to the motor by screwed sleeve 16.

The slinger 12 consists of blank plate 17 and entry plate 18 the latter having a boss 19 whereby it is secured to the end 11 of the rotor shaft. Between the plates 17 and 18 a plurality of slinger plates 20 are secured by bolts 21, these plates 20 each have a plurality of vane ridges 22 thereon and when the slinger is assembled it is preferable that such vane ridges be in staggered sequence.

The gland 14 has a union 23 thereon for the affixture of a hose 24 which extends to a mortar pump or press as indicated at 25, the motor has usual current conductors 26 and the skids 8 or other convenient part of the motor assemblage have a hauling cable 27 affixed thereto and extending to winching means as indicated at 28.

In use the feed pipe 24, the conductors 26 and the hauling cable 27 are passed through the pipe to be lined and are connected with the mortar pump, the source of E. M. F. and winching means respectively, the motor is positioned at the remote end of the pipe and the pump and motor are operated: when the mortar issues from the rotor end 11 the rapidly rotating slinger flings it onto the pipe interior, meanwhile the winching means are operated and the entire assemblage drawn through the pipe, the rate of such withdrawal being governed by the desired thickness of lining.

It will be appreciated that the mortar may be deposited in the slinger otherwise than by medium of a hollow motor rotor shaft such other means being readily designable by any competent engineer, it is further apparent that the winching and pump mechanism may be designed as required or the motor may be mounted on a wheeled or spring chassis and/or may be rendered automotive without departing from the essence of the invention.

Experiment has revealed that a considerable pressure has to be applied to the mortar by the pump to cause it to flow along the hose 24 consequently when lining long lengths of pipe (in situ for example) up to say, 300 ft. in length it is desirable or practically necessary to utilise a cement mortar having high self-lubricative properties such as the mortar subject of my copending application for patent numbered 3117/36 and dated July 30, 1936.

It is preferable that the motor employed be of induction type (i. e., non-sparking) in order that the apparatus may be used for lining pipes with bituminous emulsions or other inflammable materials if required.

However, the motor 6 may be operated by compressed air. That is to say, the motor may be of the turbine or equivalent type fitted with a suitable air supply pipe and having the exhaust leading into or communicating with the interior of the hollow shaft 10 which carries the slinger 12. In this way the force of the compressed air will not only assist in the movement of the mortar through pipe 24, but will also serve as an ejector for the mortar passing through the vanes of the slinger valve thereby supplementing centrifugal force to cause the valve to throw the motor onto the surface of the pipe to be lined.

I claim:

1. An apparatus for lining pipes, in situ, comprising a motor having a hollow shaft, means for supporting said motor for progressive movement through the pipe, a flexible coating supply line connected to one end of said shaft, a pump communicating with said supply line and a centrifugal coating slinger head mounted on the end of said hollow shaft opposite the latter's connection with the flexible coating supply line, said slinger head comprising a plurality of circular discs each having a central circular opening in registry with the opening of an adjacent disc to provide a central plastic material receiving chamber, means for holding said discs in axially spaced relation, a blank disc at the front end of the head, and a flanged disc at the rear of the head for fitting over said hollow shaft.

2. An apparatus for lining pipe, in situ, comprising a motor; means for supporting said motor for progressive movement through the pipe to be lined, said means being adapted to maintain the shaft of said motor substantially co-axial with the said pipe, a centrifugal coating slinger mounted on the end of said motor shaft, said slinger comprising a plurality of circular discs each having a central circular opening in registry with the opening of an adjacent disc to provide a central plastic material receiving chamber, means for holding said discs in axially spaced relation, a blank disc at the front end of the slinger and a flanged disc at the rear of the slinger for fitting over said shaft; a flexible coating supply line having a discharge end in juxtaposition to said plastic material receiving chamber, and pumping means in communication with said supply line.

3. Means for lining the interior of pipes, in situ, comprising, a motor and a slinger driven by the motor, said slinger comprising a hollow head having a plurality of annular peripheral outlets, a flexible connection communicating with the slinger head for supplying fluid material thereto for lining the pipes, and a cradle including a pair of skids adapted to be pulled along the pipe, said cradle supporting the motor and slinger substantially co-axially with the pipe to be coated.

HARRY RIDLEY.